United States Patent [19]

Choi

[11] Patent Number: 5,285,265
[45] Date of Patent: Feb. 8, 1994

[54] DISPLAY APPARATUS INFORMING OF PROGRAMMED RECORDING

[75] Inventor: Seung L. Choi, Suweon, Rep. of Korea

[73] Assignee: SamSung Electronics, Co. Ltd., Kyungki, Rep. of Korea

[21] Appl. No.: 779,989

[22] Filed: Oct. 21, 1991

[30] Foreign Application Priority Data

Dec. 15, 1990 [DE] Fed. Rep. of Germany ...... 90-20718

[51] Int. Cl.⁵ ............................................. H04N 5/278
[52] U.S. Cl. ..................................... 348/565; 348/705; 358/335
[58] Field of Search .......... 358/310, 335, 183, 22 PIP, 358/194.1, 191.1, 21 R, 181; 360/33.1; H04N 2/272, 2/278

[56] References Cited

U.S. PATENT DOCUMENTS

| | | | |
|---|---|---|---|
| 4,821,102 | 4/1989 | Ichikawa et al. | 358/183 |
| 4,977,455 | 12/1990 | Young | 358/335 |
| 5,023,721 | 6/1991 | Moon-Hwan | 358/181 |
| 5,027,211 | 6/1991 | Robertson | 358/183 |
| 5,047,867 | 9/1991 | Strubbe et al. | 358/191.1 |

FOREIGN PATENT DOCUMENTS

0231874 9/1990 Japan ............................. H04N 5/278

*Primary Examiner*—James J. Groody
*Assistant Examiner*—Jeffrey S. Murrell
*Attorney, Agent, or Firm*—Robert E. Bushnell

[57] ABSTRACT

A display apparatus informing of a programmed recording comprises a message generator for providing the programmed recording information is displayed a few seconds immediately prior to correspondence between a programmed recording time and the current time in response to the inputting display interruption signal, an input selecting switch for selecting tuner signals and VCR regenerating signals, a picture-in-picture part for generating the main and subscreens, and a Y/C processing part for processing the output signals of the PIP part outputting them to an output jack and a TV RF converter, respectively, wherein the interruption in watching TV is eliminated, and the troublesome key manipulations are eliminated.

12 Claims, 2 Drawing Sheets

5,285,265

DISPLAY APPARATUS INFORMING OF PROGRAMMED RECORDING

FIELD OF THE INVENTION

The present invention relates to a display apparatus for informing a user of a previously programmed recording in which, if it is time to record, a programmed recording mode is displayed on a television (TV) screen in a sub-screen, and more particularly to, a display apparatus for informing a user of a programmed recording in which a relevant message is generated through a PIP (picture in picture) circuit. The message can be generated during both a regeneration mode of a VCR (Video Cassette Recorder) or a TV broadcasting mode.

BACKGROUND OF THE INVENTION

Generally, when a viewer wants to record a predetermined program of the TV with the VCR, the viewer inputs a recording time, a broadcasting channel and a broadcasting program in advance. Then, when it is the programmed recording time corresponds to the current time, the programmed broadcasting channel is automatically selected and the VCR is subjected to the recording mode, so that the input broadcasting program is automatically recorded. Therefore, at the programmed recording time, the programmed broadcasting program to record is unconditionally recorded even when the viewer is currently watching the TV or watching a regenerated program of the VCR.

Accordingly, in the case where the viewer does not want to carry out the programmed recording, but wants to continue watching, since the recording mode of the VCR has to be converted to the original mode manually by the viewer, the viewer can not continue his watching without any interruption.

SUMMARY OF THE INVENTION

The present invention is intended to overcome the above described disadvantage of the conventional technique.

Therefore, it is the object of the present invention to provide a display apparatus for informing a user of a programmed recording, in which a sub-screen message is displayed for a few minutes or a few seconds as the viewer set arbitrarily so that the viewer can decide to carry out the programmed recording or to continue the watching before the programmed recording time so as to provide the user with an opportunity to cancel or change the programmed recording mode without any interruption.

In order to achieve the above object, the display apparatus informing of a programmed recording according to the present invention is applied to VCRs provided with a PIP function for outputting a sub-screen, a remote control function and a programmed recording function.

The display apparatus informing of a programmed recording according to the present invention comprises a message generating circuit for memorizing programmed recording information and outputting the memorized recording information a few seconds before the programmed recording time in response to the input of a display interruption signal, an input selecting switch for selecting and outputting tuner input signals or VCR regeneration signals, a PIP part for generating main and sub-screens in response to the outputs from the input selecting switch and the message generating circuit, a luminance and color processing part for processing the output signals from the PIP part in its luminance and color to provide to an output jack and an RF (Radio Frequency) converter of the TV.

BRIEF DESCRIPTION OF THE DRAWINGS

The above object and other advantages of the present invention will become more apparent from the description of the preferred embodiment of the present invention with reference to the attached drawings, in which.

DETAILED DESCRIPTION OF THE PREFERRED EMBODIMENT

Figure 1:
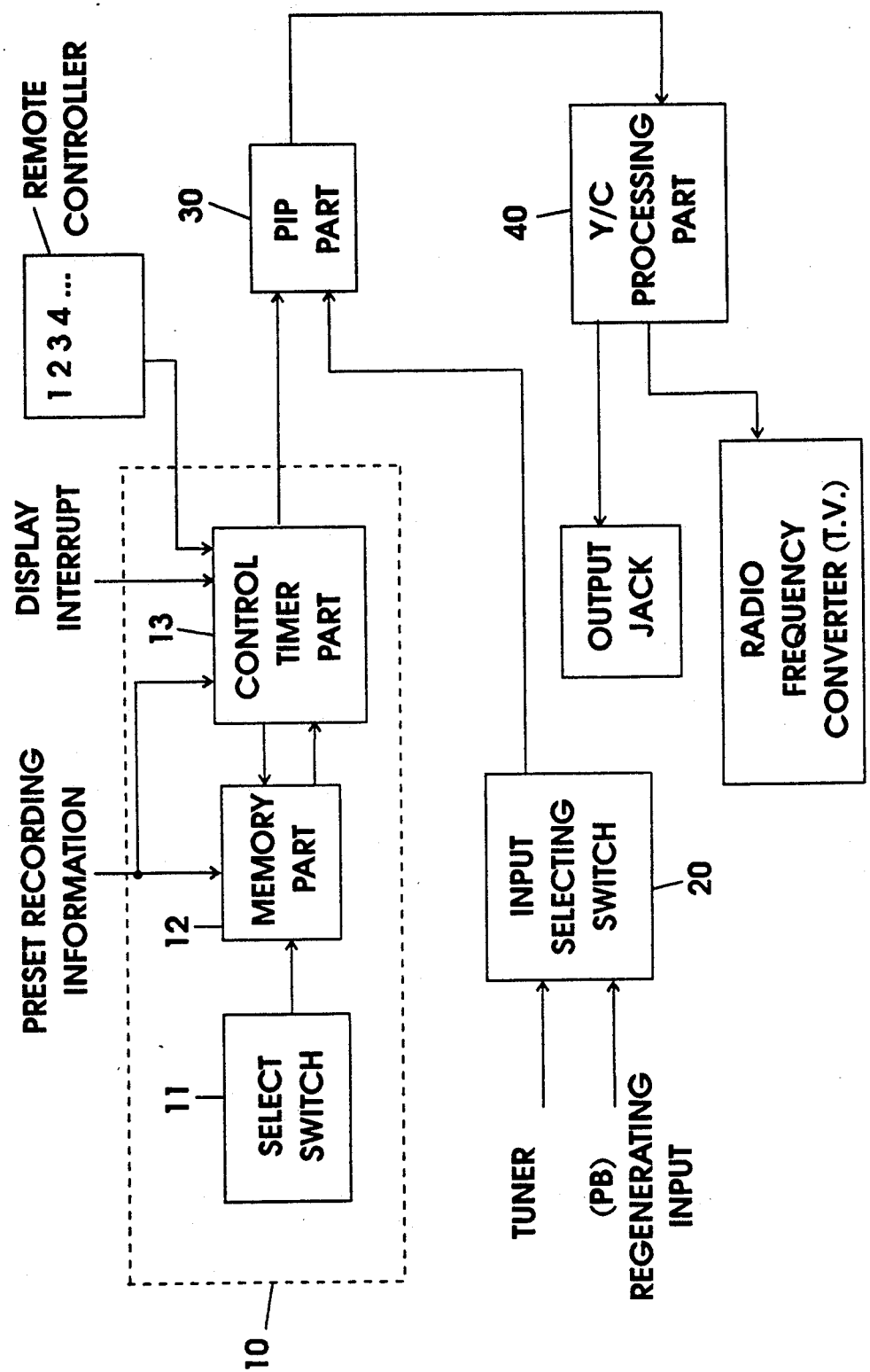
FIG. 1 is a block diagram showing the constitution of the display apparatus informing of a programmed recording according to the present invention.

FIG. 1 illustrates the constitution of the display apparatus for informing of a programmed recording according to the present invention. In FIG. 1, an output terminal of a message generating circuit 10 is connected to the input terminal of a PIP part 30 for forming main and sub-screens and an output terminal of an input selecting switch 20 for selecting one of tuner signals and VCR regenerating signals. The input selecting switch 20 is also connected to another input terminal of the PIP part 30.

Meanwhile, an output terminal of the PIP part 30 is connected to a Y/C processing part 40, and two output terminals of the Y/C processing part 40 are connected to an output jack and an RF converter of the TV, respectively.

The message generating circuit 10 comprises a memory part 12 for memorizing programmed recording command information, a control and timer part 13 for reading the stored information of the memory part 12 a few seconds or a few minutes before a predetermined programmed recording time to output the information to the PIP part 30 and for outputting a time counting signal to count-down the time until the programmed recording time to be displayed on the sub-screen so as to output the programmed recording information of the memory part 12 in response to the input of a display interruption signal, and a selecting switch 11 for enabling selection of the output of the stored information of the memory part 12.

The display apparatus of the present invention constituted as above will now be described as to its operation and effects.

First, the viewer selects a programmed recording mode in the VCR, and then, inputs a programmed recording time, a broadcasting channel and the name of broadcasting program to record. These details are provided the memory part 12 of the message generating circuit 10 for storage. At the same time, the control and timer part 13 compares the current time with the programmed recording time so as to determine the remaining time so that a few seconds or a few minutes before the programmed recording time the programmed recording information of the memory part 12 is displayed in sub-screen by the PIP part 30.

Under this condition, if there is no user input from the selecting switch 11, the output of the memory part 12 is the general information about the programmed recording such as the recording starting time, recording ending time and a programmed recording channel. On the other hand, if user selects the selecting switch 11 outputs a signal is operated, then the broadcasting program to record is outputted together with its related information.

Meanwhile, the control and timer part 13 compares the recording time with the current time and outputs the time count information to the PIP part 30 until the programmed recording time.

The input selecting switch 20 selects one signal from the tuner signals and VCR regenerating signals. The selected one signal and the output of the control and timer part 13 of the message generating circuit 10 are transferred through the PIP part 30 to the Y/C processing part 40 and processed for the luminance and color and then outputted to the output jack and the RF converter of the TV, respectively.

Meanwhile, if a display interruption signal is inputted into the timer part 13, the control and timer part 13 supplies the programmed recording information of the memory part 12 immediately to the PIP part 30 regardless of the informing of time for the programmed recording. This display interruption signal is generated by activating the relevant key of the system by the viewer.

Figure 2:
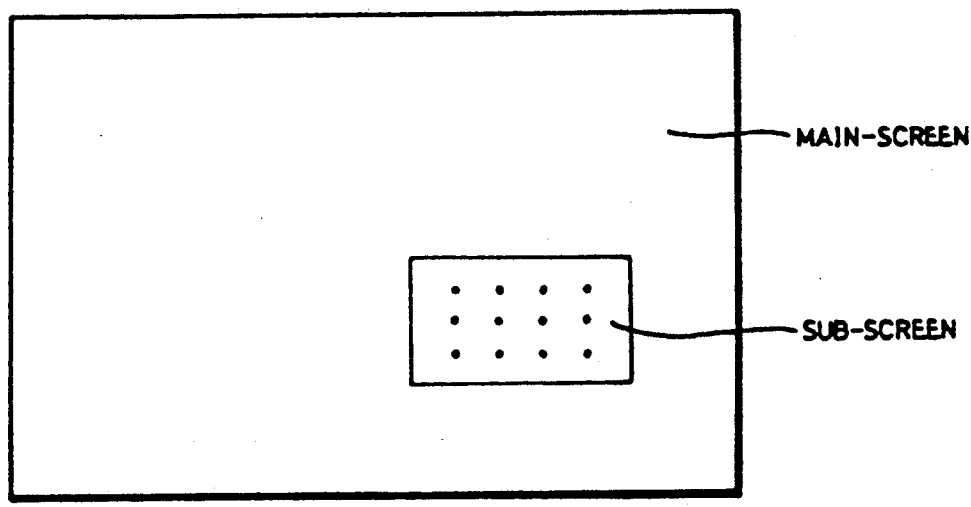
FIG. 2 is a schematic view of a TV screen formed by a preferred embodiment of the display apparatus according to the present invention.

When there is no output from the message generating circuit 10, the PIP part 30 forms the entire picture from the output signals of the input selecting switch 20. On the other hand, if there is an output from the message generating circuit 10, a sub-screen is displayed at a proper place within the main screen to inform of the programmed recording information in characters as shown in FIG. 2, where an alarm signal night is operated for a few seconds to inform the programmed recording.

Figure 3:
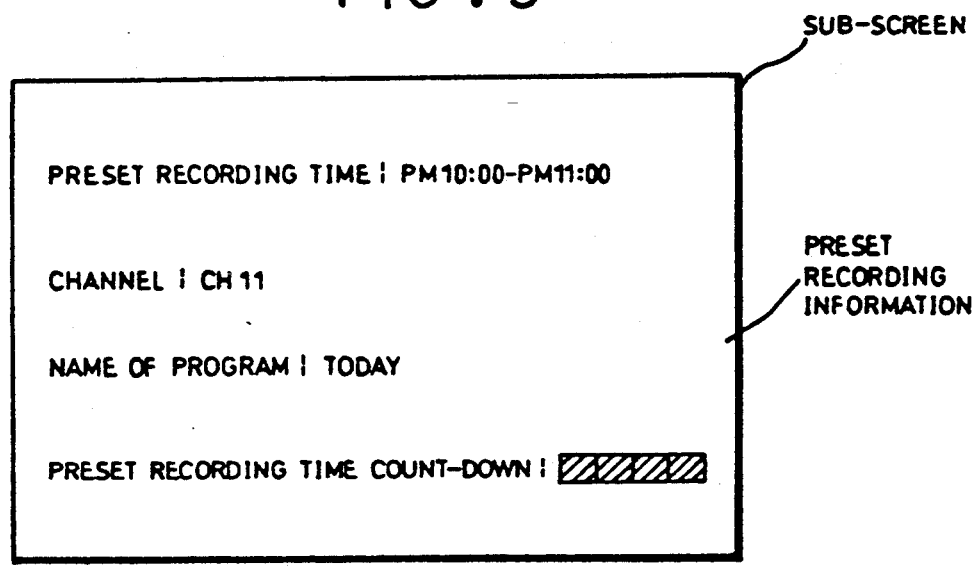
FIG. 3 is a schematic view of a message displayed in a sub-screen as shown in FIG. 2.

In a sub-screen shown in FIG. 3, the programmed recording time band is displayed from the starting time to the ending time of the programmed recording along with the relevant channel, and the count-down from the current time to the programmed recording starting time is also displayed in a level meter or in numerals. Further, the broadcasting program to record can be also displayed alternatively by altering the contents of the message for the sub-screen through the selecting switch 11, or by displaying it at the time of the initial message generation.

Thus, the viewer can watch the displayed message about the programmed recording for a few seconds or a few minutes until the programmed recording time, and therefore, the viewer can decide to keep watching the current broadcasting, to carry out the programmed recording, or to switch the programmed recording to another broadcasting program and so on.

Further, in the case where a second programmed recording is set in another time band, another sub-screen in displayed for a few seconds until the second present recording starting time, and such a sub-screen includes the information for the second present recording.

Meanwhile, if the name of a broadcasting program is to be displayed in characters on the sub-screen, character selecting function is provided by a remote controller with the numerical input keys on the remote controller signals for consonants and vowels are provided respectively during characters selecting mode.

The characters might be English and Korean letters, and these character generating functions can be performed by providing the general function to the remote controller. Therefore, the detailed descriptions on the character generating function will be omitted.

Thus, the programmed recording time band, the programmed recording channel and the name of the broadcasting program to record are displayed for a few seconds or a few minutes until the programmed recording time in the form of a sub-screen in the main screen of the current broadcasting, as well as the time count-down states (down to the programmed recording time) in numerals or in a level meter.

Accordingly, if the programmed recording time comes while watching a broadcasting, the programmed recording information is displayed on the sub-screen for informing the recording information, or the alarm signal is operated for informing of the programmed recording so as to decide either to keep watching the current broadcasting, or to carry out the programmed recording. Thus, the function of the VCR is expanded and rendered more conveniently without the inconvenient manipulating the apparatus or the interruption of the watching broadcasting program.

What is claimed is:

1. A display apparatus for informing of a programmed recording in a video tape recorder having a picture-in-picture function for simultaneously generating main screens and sub-screens, a remote function, and a programmed recording function, the apparatus comprising:

memory means for storing program information for a programmed recording;

timer and control means for automatically providing said program information from said memory means together with time countdown data, representative of a difference between a current time and a programmed recording time, for a predetermined time period before said programmed recording time or in response to user input of a display interruption signal;

a display selecting switch for selecting sad program information for display in a sub-screen;

an input selecting switch for selectively providing one of tuner signals and regenerating signals as selected signals;

picture-in-picture means for generating video signals representing main screens and sub-screens in response to said selected signals and said program information provided by said timer and control means; and luminance and color processing means for processing luminance and color portions of said video signals from said picture-in-picture means for provision into an output jack and a radio frequency converter of a television.

2. The display apparatus as claimed in claim 1, further comprised of said timer and control means providing said program information from said memory means immediately in response to input of said display interruption signal regardless of said programmed recording time.

3. The display apparatus as claimed in claim 1, wherein said program information includes a name of a programmed broadcasting program.

4. The display apparatus as claimed in claim 3, wherein the name of said programmed broadcasting program is provided to said timer and control means by a character selecting function of a remote controller with consonants and vowels by manipulating channel selection buttons of said remote controller.

5. The display apparatus as claimed in claim 1, wherein an alarm signal is provided for a few seconds before the programmed recording time.

6. A display apparatus for a video tape recorder, said apparatus comprising:

user input means for enabling user entry of a recording start time, a recording stop time, and program information for a recording operation of said video tape recorder;

memory means for storing said program information for said recording operation;

timer and control means for storing said recording start time and said recording stop time, and for comparing said recording start time to a current time and providing record imminent signals at a predetermined time period before said recording start time equals said current time, and for automatically providing said program information from said memory means together with time countdown data, representative of a difference between said current time and said recording start time, for said predetermined time period;

a display selecting switch for selecting said program information for display in a sub-screen;

an input selecting switch for selectively providing one of tuner signals and regenerated signals as selected signals;

picture-in-picture means for receiving said selected signals, and for generating video signals by mixing a visual indication of said program information and said time countdown data into said selected signals in response to said record imminent signals; and luminance and color processing means for processing luminance and color portions of said video signals from said picture-in-picture means for provision into an output jack and a radio frequency converter of a television.

7. A display apparatus as claimed in claim 6, further comprised of said timer and control means providing said recording start time and said recording stop time to said picture-in-picture means, and said picture-in-picture means mixing visual indications of said recording start time and said recording stop time into said selected signals to generate said video signals in response to said record imminent signals.

8. A display apparatus as claimed in claim 6, further comprised of said timer and control means generating display interrupt signals in response to user control and said picture-in-picture means mixing visual indications of said recording start time and said recording stop time into said selected signals in response to said display interrupt signals to generate said video signals.

9. A method for controlling change-over to a pre-programmed recording operation in a video tape recorder in response to a user programmed record start time, said method comprising:

enabling user entry of said record start time;

comparing said record start time to a current time to provide record imminent signals at a predetermined time period before said programmed recording time will correspond to said current time; and displaying a visual indication to inform a user that change-over to said pre-programmed recording operation is imminent on a display device in response to said record imminent signals, said visual indication including a display of a length of time before said programmed recording time corresponds to said current time.

10. A method as claimed in claim 9, wherein displaying said visual indication includes displaying a visual indication of said record start time on said display device.

11. A method as claimed in claim 9, further comprising enabling user disablement of said pre-programmed recording operation.

12. A method as claimed in claim 9 further comprising enabling user disablement of said pre-programmed recording operation.

* * * * *

UNITED STATES PATENT AND TRADEMARK OFFICE
CERTIFICATE OF CORRECTION

PATENT NO. : 5,285,265

DATED : February 8, 1994

INVENTOR(S) : Seung Lyul Choi

It is certified that error appears in the above-indentified patent and that said Letters Patent is hereby corrected as shown below:

Column 3, line 4, after "if", insert --the--, delete "out-"; and
line 5, delete "puts a signal".

Column 4, line 28, after "remote", insert --control--; and
line 41, change "sad" to --said--.

Signed and Sealed this

Thirteenth Day of December, 1994

Attest:

BRUCE LEHMAN

*Attesting Officer*  *Commissioner of Patents and Trademarks*